(12) United States Patent
Slack et al.

(10) Patent No.: US 7,997,041 B2
(45) Date of Patent: Aug. 16, 2011

(54) SYSTEM METHOD FOR INTERLOCKING SUPPORT BLOCKS

(75) Inventors: David C. Slack, Tampa, FL (US); Navin Kadakia, Bridgeville, PA (US); Joseph M. Bonazza, Tarentum, PA (US)

(73) Assignee: Seven Trent Water Purification, Inc., Colmar, PA (US)

( * ) Notice: Subject to any disclaimer, the term of this patent is extended or adjusted under 35 U.S.C. 154(b) by 513 days.

(21) Appl. No.: 12/279,364

(22) PCT Filed: Feb. 15, 2006

(86) PCT No.: PCT/US2006/005456
§ 371 (c)(1),
(2), (4) Date: Aug. 14, 2008

(87) PCT Pub. No.: WO2007/094788
PCT Pub. Date: Aug. 23, 2007

(65) Prior Publication Data
US 2009/0014374 A1    Jan. 15, 2009

(51) Int. Cl.
*E04C 3/00*    (2006.01)
*E04C 2/04*    (2006.01)
*E04B 2/00*    (2006.01)
*B01D 24/00*    (2006.01)
*B01D 24/12*    (2006.01)

(52) U.S. Cl. ....... 52/589.1; 52/578; 52/590.1; 52/590.2; 52/591.1; 52/592.1; 52/588.1; 52/604; 210/289; 210/293

(58) Field of Classification Search ............ 52/578, 52/589.1, 590.1, 590.2, 591.1, 591.2, 591.4, 52/591.5, 592.1, 592.2, 592.3, 592.4, 596, 588.1, 597, 604; 210/275, 293, 289
See application file for complete search history.

(56) References Cited

U.S. PATENT DOCUMENTS
3,148,477 A    9/1964    Acton et al.
(Continued)

FOREIGN PATENT DOCUMENTS
GB    0814131.9    6/2010

OTHER PUBLICATIONS
Office Action dated May 25, 2010 for U.S. Appl. No. 11/728,868.
(Continued)

*Primary Examiner* — Brian E Glessner
*Assistant Examiner* — Omar Hijaz
(74) *Attorney, Agent, or Firm* — D'Ambrosio & Menon, LLP; Usha Menon

(57) ABSTRACT

A system and method for forming a filter media support system with dual locking mechanisms. The support system comprises two or more interlocking rows of support blocks. One or more slides and one or more guides protrude from the side walls of the blocks. Each guide is conformed to receive one slide from a neighboring block, forming a first locking joint. The side walls also comprise one or more posts and one or more sockets. Each post is conformed to fit within one socket of a neighboring block, forming a second locking joint. In one embodiment, the method for assembling the support system comprises aligning a slide of a first support block with a guide of a second support block. The slide of the first support block is vertically moved into the guide of the second support block. Force is applied so that the posts snap-lock into the sockets.

34 Claims, 4 Drawing Sheets

U.S. PATENT DOCUMENTS

| | | | | |
|---|---|---|---|---|
| 4,287,693 | A | * | 9/1981 | Collette .................... 52/177 |
| 4,376,593 | A | * | 3/1983 | Schaefer ................... 403/231 |
| 4,923,606 | A | * | 5/1990 | Gresh et al. ............... 210/275 |
| 5,076,534 | A | * | 12/1991 | Adam ....................... 248/678 |
| 5,890,836 | A | | 4/1999 | Leech |
| 6,050,044 | A | * | 4/2000 | McIntosh .................. 52/591.1 |
| 6,071,041 | A | | 6/2000 | Knight |
| 6,079,902 | A | | 6/2000 | Pettee, Jr. |
| 6,244,009 | B1 | * | 6/2001 | Cerrato ..................... 52/604 |
| 6,255,102 | B1 | | 7/2001 | Hallsten |
| 6,526,705 | B1 | * | 3/2003 | MacDonald ............... 52/177 |
| D483,499 | S | * | 12/2003 | Payne ....................... D25/113 |
| 7,141,164 | B2 | | 11/2006 | Slack et al. |
| 2003/0080040 | A1 | | 5/2003 | Savage et al. |
| 2005/0028475 | A1 | | 2/2005 | Barlow et al. |
| 2005/0218061 | A1 | | 10/2005 | Slack et al. |
| 2006/0053725 | A1 | | 3/2006 | Su |
| 2006/0283125 | A1 | * | 12/2006 | Moller ...................... 52/578 |

OTHER PUBLICATIONS

Co-pending U.S. Appl. No. 11/728,868 filed Mar. 27, 2007.

USPTO Final Office Action dated Jan. 14, 2011 for co-pending U.S. Appl. No. 11/728,868.

SIPO Office Action dated Jan. 4, 2009 for Chinese Counterpart Application No. 200680052832.1 filed Aug. 14, 2008.

SIPO Office Action dated May 5, 2011 for Chinese Counterpart Application No. 200680052832.1 filed Aug. 14, 2008.

USPTO Supplemental Non Office Action dated Jan. 24, 2011 for co-pending U.S. Appl. No. 11/728,868.

\* cited by examiner

SYSTEM METHOD FOR INTERLOCKING SUPPORT BLOCKS

PRIORITY CLAIM

This is a U.S. National Stage application under 35 U.S.C. 371 of PCT application No. PCT/US2006/005456, filed on Feb. 15, 2006, and designating the United States. The entire disclosure of this PCT application No. PCT/US2006/005456 entitled "System and Method for Interlocking Support Blocks," is incorporated by reference herein.

FIELD OF THE INVENTION

The present invention relates to a support system for a filter media system. More particularly, the present invention relates to a system and method for interlocking filter media support blocks.

BACKGROUND

Water, wastewater, and industrial filtration units typically have an underdrain system for supporting filter media and spacing the filter media apart from the bottom of the filter. In addition to providing support for the filter media, the underdrain system serves two primary purposes: to collect the filtered water that passes through the media and to uniformly distribute backwash water, backwash air, or a combination of both, across the filter.

Formations of support blocks are often used construct the underdrain system. The support blocks may be made of precast concrete blocks or concrete filled plastic jacketed blocks. The high-strength concrete blocks are placed side-by-side and end-to-end in the bottom of the filter to form a "false bottom." The blocks provide support for the filter media and are shaped to collect the filtered water that passes through the media.

In operation, a media filter will periodically require cleaning by backwashing the filter. In addition to shaping for collection, the blocks have conduits, commonly known as laterals, to allow for the passage of air or water used as a backwash. Piping, such as air headers, is part of the backwash air distribution system. Backwash water is brought into the system by flumes. Air headers bring in pressurized air, which is distributed into the laterals by pipes from the top of the headers, through the flumes and into the laterals.

During backwash operations, air is forced through the air distribution pipes and into the air laterals of the underdrain blocks. The pressurized air can be used as a backwash or combined with water for an air/water backwash. The pressurized air/water combination causes the filtered water to be passed upward through the media with sufficient velocity to prevent filter problems such as mud balls, filter cracking, agglomeration buildup on the media grains, and inactive areas within the filter. The underdrain blocks also form a barrier to physically separate the filter media from the air distribution pipes underneath the blocks. Separating the filter media from the air distribution pipes prevents the finer particles of the filter media from clogging of the orifices in the pipes.

Problems can occur during backwash because the upward pressure of the air and/or water against the blocks is too forceful. Sometimes the pressure can fall within a range of 2 psi to 6 psi. Such strong pressure tends to dislocate the blocks, a process known as uplift. When uplift occurs, filter media drops onto the pipes and damages the infrastructure. Repairing such damage is costly. In addition, the costs of emptying the filter and realigning the blocks are also expensive. The process is labor intensive and requires substantial downtime of the filter. As a consequence, there is a need for a support system that resists uplift.

In the existing systems for filter media support, several types of support blocks systems have been used. In U.S. Pat. No. 6,143,188 to Jantsch et al., grout is used to fill the gaps between the blocks. Other systems simply rely on the weight of the blocks to prevent block movement. In U.S. Pat. No. 6,325,931 to Roberts, side rails function to help align the blocks side-to-side in the filter basin. The side rails on one side are offset from the side rails on the other side to allow the rails to overlap with the rails of an adjacent block to prevent uplift.

One further example of an underdrain system, U.S. Pat. No. 5,160,614 to Brown, comprises a series of modular, interconnected air duct blocks. The row of air duct blocks extends transversely to a plurality of laterals. The laterals are defined by the connection of individual underdrain blocks in parallel adjacent rows. The air duct blocks are interconnected such that interiors of the separate air duct blocks are in fluid communication with one another to supply backwash gas through a single source of gas supply.

Existing underdrain block designs offer only a limited amount of backwash stability and some are difficult to assemble. Because stability in the support system is important to avoid damage to the infrastructure, there is a need for an improved underdrain system that is easily assembled and will limit the movement of the underdrain blocks during backwash procedures in both the vertical and horizontal directions.

DEFINITIONS

For the purposes of this invention, a guide is defined as a device for steadying or directing the motion of a slide.

For the purposes of this invention, a slide is defined as an extension that is guided by one or more parts within which it slides.

SUMMARY

The present invention provides stability against the horizontal and vertical movement of the support blocks caused by uplift forces during backwash procedures. To resolve the problem caused by uplift, the present invention provides a dual locking system that resists both horizontal and vertical movement of the blocks. Advantageously, interlocking slides and guides form a first locking joint, Posts positioned on the side walls of the support blocks form a second locking joint when inserted into sockets of a neighboring support block. The posts and sockets are held in place by interlocking slides and guides. The second locking joints formed by the posts and sockets resist vertical movement of the blocks.

The support system is easily assembled because, in one embodiment, the support blocks can be interlocked by vertical assembly. The slide of one block moves downwardly into the guide of another. In this manner, no horizontal space, in which to lay out and slide the support block, is needed. This is a benefit when a filter support system needs to be assembled in a tight space.

In another embodiment, the support system of the present invention comprises two or more interlocking rows of support blocks. Each support block comprises a shell. The shell comprises a first side wall, a second side wall, a first end wall, a second end wall, a top wall, and a bottom wall. One or more slides protrude from the first side wall. One or more guides protrude from the second side wall. Each guide is conformed to receive one slide from a neighboring support block, so that as the blocks are aligned in rows, the slides on one row of blocks are inserted into the guides of an adjacent row of blocks.

Advantageously, each guide comprises a first projection and a second projection distal from the first projection and the slide is shaped to closely fit between the first projection and the second projection. The first side wall defines one or more sockets. The second side wall further comprising one or more posts. Each post is conformed to fit within one socket of a neighboring support block. As the slides are slipped into the guides, each post is snap-locked into a socket.

In one embodiment of the method of this invention, the method of assembling the support system comprises aligning a slide of a first support block with a guide of a second support block. The slide of the first support block is vertically moved into the guide of the second support block. Each support block has a first wall and a second side wall. The posts from the second side wall are snap locked into the sockets of the first side wall.

DETAILED DESCRIPTION

Figure 1:
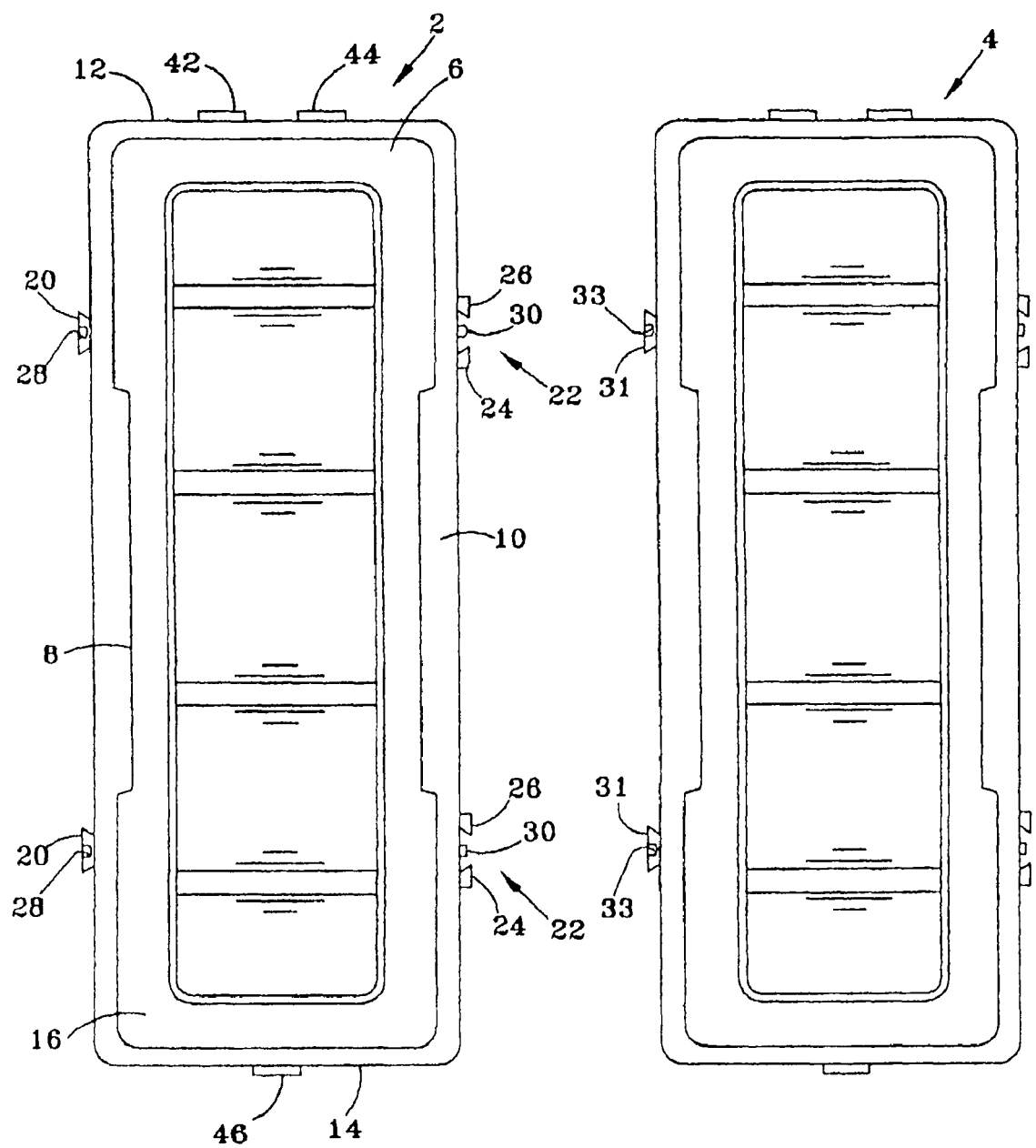
FIG. 1 is a top view of one embodiment of the support system illustrating two support blocks.

Referring now to FIG. 1, a top view of one embodiment of a media support system for a filter is shown. The support system is used to provide a false bottom for the filter. The false bottom provides a space for the infrastructure, backwash piping laterals, and sumps. The false bottom also protects the infrastructure from media filtering down towards the bottom. The support system can be used in a wastewater filter system.

Figure 2:
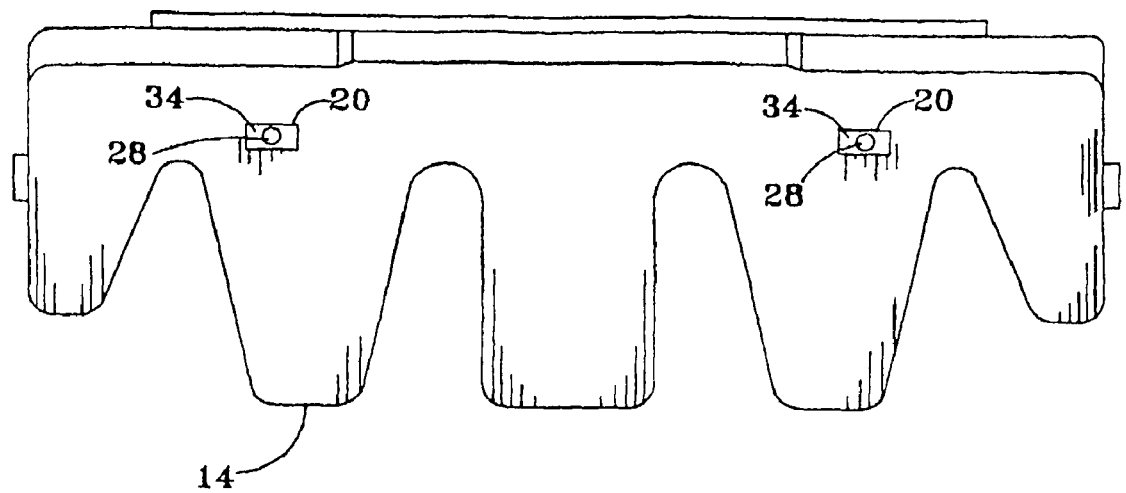
FIG. 2 is a side view of the first side wall of a support block showing the ends of the slides and the sockets.

The support system comprises two or more interlocking rows of support blocks 2, 4. Multiple rows of support blocks will often be used to form the false bottom of the filter. A row is formed by support blocks placed end to end. Each support block 2 comprises a shell 6. The shell 6 comprises a first side wall 8, a second side wall 10, a first end wall 12, a second end wall 14, a top wall 16, and a bottom wall 18 (FIG. 2). In one embodiment, the shell is made of a plastic material. The shell forms a cavity which may be filled with material to increase the weight of the block. The weight of the blocks helps resist uplift forces. Examples of suitable fill materials include gravel, cement, and sand.

Advantageously, the interlocking support system having blocks locked in adjacent rows uses the combined weight of the connected blocks to resist the uplift forces. The present invention comprises a dual locking system that resists both horizontal as well as vertical movement of the blocks. In one embodiment, the interlocking mechanism comprises one or more slides 20 protruding from the first side wall 8. One or more guides 22 protrude from the second side wall 10. Each guide 22 is conformed to receive one slide 31 from a neighboring support block. Each guide 22 comprises a first projection 24 and a second projection 26 distal from the first projection 24. The slide is shaped to closely fit between the first and second projections.

The interlocking blocks are aligned side-by-side so that the guides 22 of the block in a first row face the slides in a second row. As the blocks are placed on the floor of the filter, the guides 22 and slides 31 are aligned and the slide 31 moves between the first and second projections 24, 26 of the guide 22, forming the first locking joint to interlock the blocks. The placement of the blocks continues until the false bottom is completed and each row interlocks with an adjacent row. The interlocking of one row of blocks with another row helps the support system resist uplift and shifting caused by the backwash procedure.

To further secure the interlock of the blocks, the first side wall 8 defines one or more sockets 28. The second side wall 10 further comprises one or more posts 30. Each post 30 is conformed to fit securely within one socket 33 of a neighboring support block 4 to form the second locking joint.

The guides, slides, posts, and sockets 20, 22, 30, 31, 32 that form the double interlock mechanism may be either molded into the side walls 8, 10 of the blocks or attached as separate pieces. The molded interlock mechanisms are formed as features of the plastic blocks when they are manufactured. The molded features are formed from the side walls themselves rather than being separate pieces added to the side walls. When parts 20, 24, 26, 30, 31 are formed from separate pieces, they are attached by any suitable attachment means, such as an adhesive or screw attachment.

In one embodiment, the support blocks 2 comprise at least two guides 22, at least two slides 31, at least two posts 30, and at least two sockets 33. The guides 22, slides 31, posts 30, and sockets 33 can be positioned adjacent to the end walls 12, 14 of the support blocks, rather than close to the mid point of the support block. Positioning these interlocking parts adjacent to the end walls decreases movement of the support blocks.

FIG. 2 illustrates a detailed side view of one embodiment of the support block 2 where each slide 20 comprises an end surface 34. Each end surface 34 of a slide defines one socket 28. In this embodiment the post 30 can be positioned between the projections 24, 26 of the guide 22. When the slides of one row of blocks locks into the guides of a second row of blocks, the post 30 within each guide 22 interlocks with a socket 33 on the end surface of each slide 31 to further secure the block and form the second locking system. In this arrangement, the guide 22 and slide 31 work to align the post 30 and socket 33.

Additionally, the guide 22, slide 31, post 30, and socket 33 work together to snap-lock the blocks together. When the slide 31 is inserted into the guide 22, the post 30 contacts the end surface 34 of the slide. Due to the elastomeric nature of the support block, as force is applied to continue the movement of the slide, the support block flexes to allow the motion to continue. The flexing occurs in the side walls 8, 10, the guide 22, the slide 31, or any combination of the three. When the post 30 and socket 33 align, the flexing stops and the post 30 is forced into the socket 33, snap-locking the post 30 into the socket 33.

Reversing the snap-locking of the post 30 into the socket 33, to unlock the blocks is more difficult than engaging the post and socket because the post is held in the socket by the engagement of guide 22 and slide 31. While in the socket 33, the post 30 can not push against the end surface 34 of the slide to cause the flexing necessary to remove the post 30 from the socket 33.

The engagement of the post into the socket resists the vertical forces associated with uplift. When the post is in the socket, the overlapping areas of the post and socket prevent the independent upward movement of one block alone. When one block attempts to lift upward, its posts and sockets are restrained by the posts and sockets of the adjacent blocks.

Figure 3:
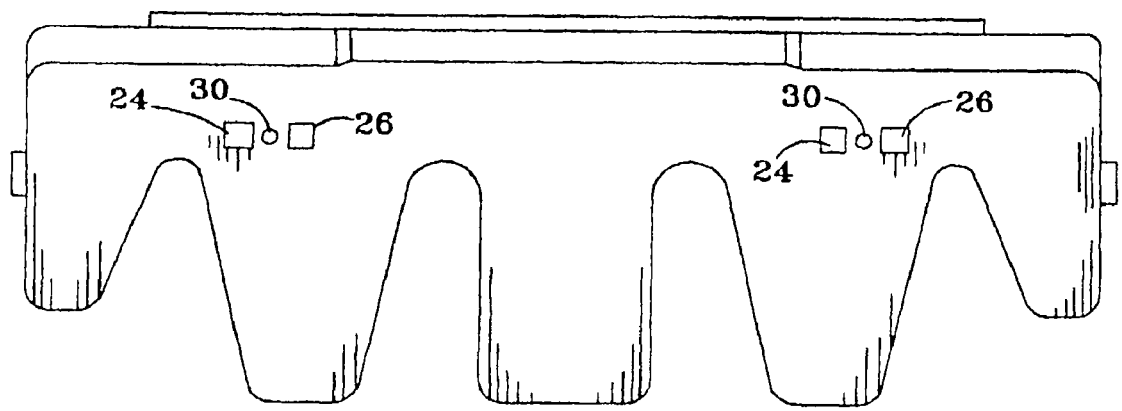
FIG. 3 is a side view of the second side wall of the support block showing the guides and the posts.

Referring now to FIG. 3, in one embodiment, the first projection 24 of the guide and the second projection 26 of the guide are vertically aligned. This allows the slide 31 to engage the guide 22 by moving vertically into the guide 22. Moving and aligning the support blocks may be done either manually or with assistance of a lifting machine, such as a crane or backhoe. Vertical engagement of guide and slide allow the support system to be assembled with greater ease than horizontal engagement. Vertical engagement requires less working area then horizontal engagement because the guide and slide are aligned directly above one another rather than offsetting the blocks and sliding the entire block. Additionally, in vertical engagement, gravity will assist in providing the downward force necessary to snap-lock the post 30 into the socket 33.

Figure 4:
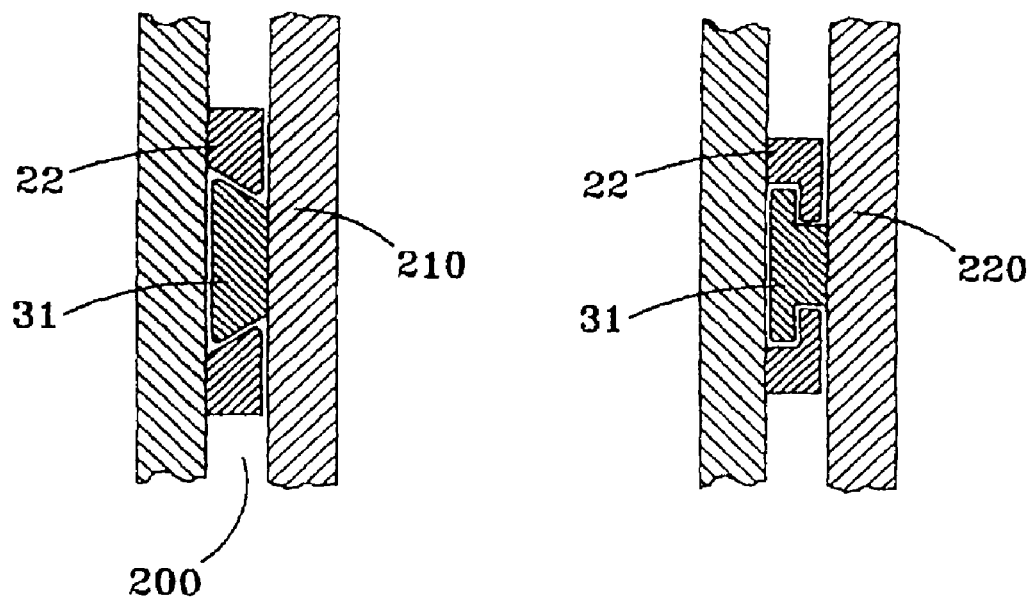
FIG. 4 is a top view of both a fan shaped slide form and T-shaped slide interlocked with complementary guides.

Referring now to FIG. 4, in one embodiment of the support system, each guide 22 forms a first locking joint 200 with one slide 31 of a neighboring support block. The first locking joint 200 resists horizontal movement of the support blocks. Forming the first locking joint 200 causes the post 30 of one block to protrude into one socket of a neighboring block 33 forming the second locking joint. In one embodiment, the slide can be fan-shaped 210. In an alternate embodiment, the slide is T-shaped 220. Both the fan-shaped 210 and T-shaped 220 slides, along with their complementary guides 22, form the first locking joint 200 that resists the forces horizontally pulling the neighboring blocks apart. The shape of the guides 22 allows the slides 31 to easily move into the guides 22 in a direction tangential to the side walls of the blocks, however, when the slides 31 and guides 22 are T-shaped or fan-shaped, the guide 22 will pull against the slide 31 to prevent the blocks from pulling apart.

Figure 5:
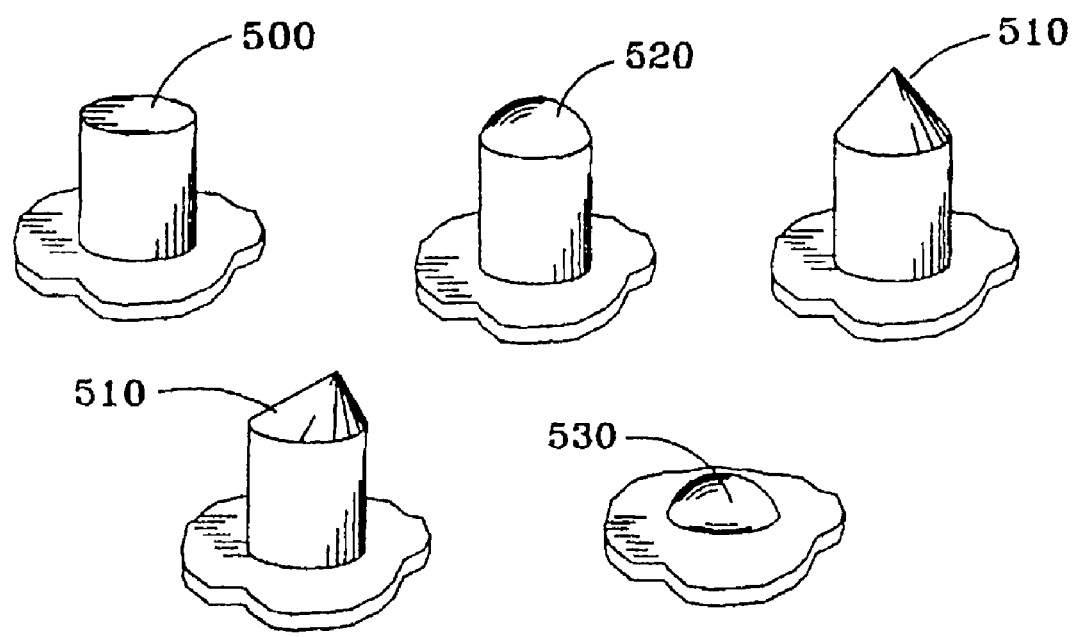
FIG. 5 is a side view of several embodiments of the post.

Referring now to FIG. 5, in one embodiment of the support system, each post is cylindrically-shaped 500 and each socket 33 is shaped to form a close fit with the post 500. In a further embodiment, the cylindrically-shaped post 500 has sloped end surface 510. In still another embodiment, the cylindrically-shaped post 500 comprises a rounded end surface 520. Alternatively, the post and socket may be substantially semi-spherically shaped 530. The sloped and rounded end surfaces 510, 520, 530 assist in the engagement of the post and socket, by reducing the surface area in contact between the post 30 and end surface 34 of the guide. This reduces friction forces resisting the movement of the post 30.

Figure 6:
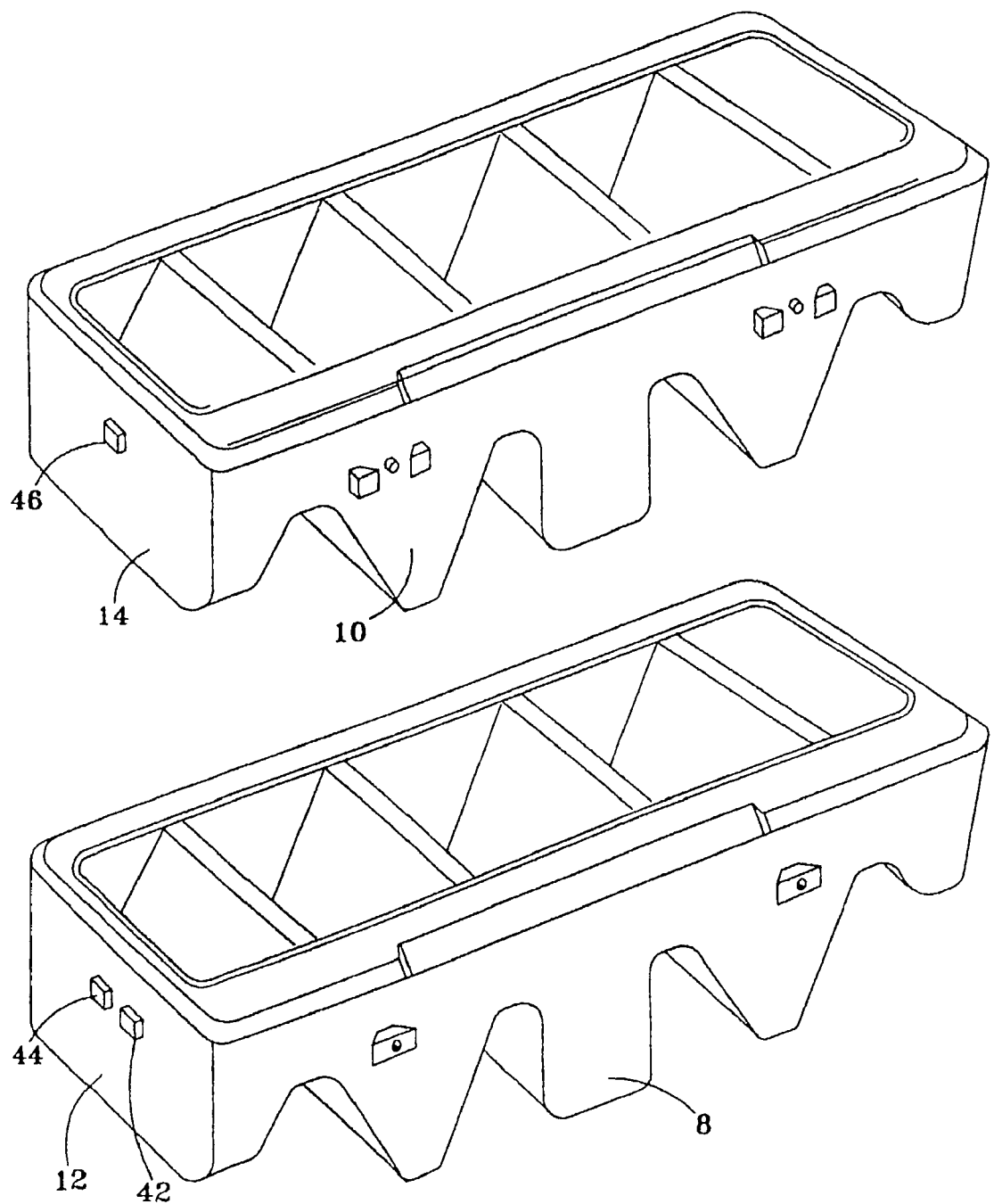
FIG. 6 is a three dimensional end view of both the end walls of the support block.

Referring now to FIG. 6, in one embodiment of the support system, the first end wall 12 comprises a first tab 42 and a second tab 44. The first tab 42 is horizontally aligned to the second tab 44. The second end wall 14 comprises a third tab 46. The third tab 46 is positioned to fit between the first tab 42 and the second tab 44 of a neighboring support block. The engagement of tabs on the end walls of the support blocks also aids to resist the horizontal movement of the blocks.

Assembling the filter media support system of the present invention is often performed on-site. In one embodiment of the method of interlocking support blocks for a filter system, the method comprises aligning a slide 31 of a first support block with a guide 22 of a second support block. The slide 31 of the first support block is moved vertically into the guide 22 of the second support block. While moving and aligning the support blocks may be performed in any reasonable manner, often the support blocks will be moved manually. A crane, backhoe, or other lifting device may also be employed to assist in moving the blocks.

While the force of gravity may be enough to engage the blocks, the method may further comprise applying a downward force to the first support block until a post 30 on the second support block snap-locks into a socket 33 on the first support block. In an additional embodiment, the method comprises fitting one tab 46 located on an end wall of the first support block may be between two tabs 42, 44 on an end wall of an adjacent support block.

To assemble the entire support system which forms the false bottom of the filter, the methods of this invention may be repeated as many times as necessary.

While the system an method of the invention has been shown and described with reference to several embodiments, it will be understood by those skilled in the art that various changes in form and detail may be made therein without departing from the spirit and scope of the invention. The described embodiments are presented for the purposes of illustration and not limitation; the present invention is limited only by the claims that follow.

The invention claimed is:

1. A support system for a filter comprising:
   two or more interlocking rows of support blocks;
   each support block comprising a shell,
      the shell comprising a first side wall, a second side wall, a first end wall, a second end wall, a top wall, and a bottom wall;
   one or more slides protruding from the first side wall;
   one or more guides protruding from the second side wall, each guide conformed to receive one slide from a neighboring support block;
   each guide comprising a first projection and a second projection distal from the first projection;
   each slide comprising an end surface, the end surface defining a socket; and
   the second side wall further comprising one or more posts, each post protruding from a portion of a surface of the second side wall between the first and second projection of one guide, each post conformed to fit within one socket of a neighboring support block.

2. The support system of claim 1 wherein each post is positioned within one guide.

3. The support system of claim 2 wherein each slide comprises an end surface, each end surface defining one socket so that the post within the guide interlocks with the socket on the end surface of the slide.

4. The support system of claim 1 wherein the first projection and second projection are horizontally aligned.

5. The support system of claim 1 wherein the slide is fan-shaped.

6. The support system of claim 1 wherein the slide is T-shaped.

7. The support system of claim 1 wherein each guide forms a first locking joint with one slide of a neighboring support block, the first joint resisting horizontal movement of the support blocks, and
   each post protrudes into one socket of a neighboring block to form a second locking joint, the second joint resisting vertical movement of the support blocks.

8. The support system of claim 1 wherein each post is cylindrically-shaped and each socket is shaped to form a close fit with the socket.

9. The support system of claim 8 wherein the cylindrically-shaped post comprises a sloped end surface.

10. The support system of claim 9 wherein the cylindrically-shaped post comprises a rounded end surface.

11. The support system of claim 1 wherein the post and socket are substantially semi-spherically shaped.

12. The support system on claim 1 wherein the shell comprises plastic material.

13. The support system of claim 1 wherein the guides and slides are molded within the side walls.

14. The support system of claim 1 wherein the first end wall comprises a first tab and a second tab, the first tab horizontally aligned to the second tab; and the second end wall comprises a third tab positioned to fit between the first tab and the second tab of a neighboring support block.

15. The support system of claim 1 wherein the filter system is a wastewater filter system.

16. The support system of claim 1 wherein each support block comprises at least two guides, at least two slides, at least two posts, and at least two sockets.

17. The support system of claim 16 wherein each guide is positioned adjacent an end of the second side wall and each slide is positioned adjacent an end of first side wall.

18. A support block for a filter system comprising: a shell, the shell comprising a first side wall, a second side wall, a first end wall, a second end wall, a top wall, and a bottom wall;

one or more slides protruding from the first side wall;

one or more guides protruding from the second side wall, each guide conformed to receive one slide from a neighboring support block;

each guide comprising a first projection and a second projection distal from the first projection;

each slide comprising an end surface, the end surface defining a socket; and the second side wall further comprising one or more posts, each post protruding from a portion of a surface of the second side wall between the first and second projection of one guide, and each post is conformed to fit within one socket of a neighboring support block.

19. The support block of claim 18 wherein the first projection and second projection are horizontally aligned.

20. The support block of claim 18 wherein the slide is fan-shaped.

21. The support block of claim 18 wherein the slide is T-shaped.

22. The support block of claim 18 wherein posts and sockets are cylindrically-shaped.

23. The support block of claim 22 wherein the cylindrically-shaped post comprises a sloped end surface.

24. The support block of claim 22 wherein the cylindrically-shaped post comprises a rounded end surface.

25. The support block of claim 23 wherein the post is shaped to snap-lock into the socket.

26. The support block of claim 18 wherein the guide and slide are molded within the side walls.

27. The support block. of claim 18 wherein the post and socket are substantially semi-spherically shaped.

28. The support block of claim 18 wherein the shell comprises plastic material.

29. The support block of claim 18 wherein the first end wall comprises a first tab and a second tab the first tab horizontally aligned to the second tab; and the second end wall comprise a third tab positioned to fit between the first tab and the second tab of a neighboring support block.

30. The support block of claim 18 wherein the block comprises at least two guides, at least two slides, at least two posts, and at least two sockets.

31. A method of interlocking support blocks for a filter system as defined in claim 18, the method comprising:

aligning a slide of a first support block with a guide of a second support block: and vertically moving the slide of the first support block into the guide of the second support block.

32. The method recited in claim 31, further comprising applying a downward force to the first support block until a post on the second support block snap-locks into a socket on the first support block.

33. The method recited in claim 31, wherein the filter system comprises multiple rows of support blocks and the method further comprises the step of interlocking one row of support blocks with an adjacent row of support blocks according to the method of claim 31.

34. The method recited in claim 31, further comprising fitting one tab located on an end wall of the first support block between two tabs an end wall of an adjacent support block.

* * * * *